United States Patent
Boris et al.

(10) Patent No.: US 9,376,540 B2
(45) Date of Patent: Jun. 28, 2016

(54) PARTICLES WITH DESIGNED DIFFERENT SIZED DISCRETE PORES

(71) Applicants: David Charles Boris, Webster, NY (US); Teresa Joy Hosmer, Webster, NY (US); Mridula Nair, Penfield, NY (US)

(72) Inventors: David Charles Boris, Webster, NY (US); Teresa Joy Hosmer, Webster, NY (US); Mridula Nair, Penfield, NY (US)

(73) Assignee: EASTMAN KODAK COMPANY, Rochester, NY (US)

(*) Notice: Subject to any disclaimer, the term of this patent is extended or adjusted under 35 U.S.C. 154(b) by 404 days.

(21) Appl. No.: 13/749,748

(22) Filed: Jan. 25, 2013

(65) Prior Publication Data

US 2014/0213662 A1    Jul. 31, 2014

(51) Int. Cl.
*C08L 67/00* (2006.01)
*C08J 9/28* (2006.01)
*C08J 9/00* (2006.01)

(52) U.S. Cl.
CPC ............. *C08J 9/283* (2013.01); *C08J 9/0061* (2013.01); *C08J 2201/0502* (2013.01); *C08J 2205/048* (2013.01); *C08J 2367/00* (2013.01); *C08J 2401/02* (2013.01)

(58) Field of Classification Search
None
See application file for complete search history.

(56) References Cited

U.S. PATENT DOCUMENTS

| 4,040,990 | A | * | 8/1977 | Neely ............................ 521/29 |
| 4,070,283 | A | * | 1/1978 | Kirkland ...................... 210/656 |
| 5,593,729 | A | * | 1/1997 | Frechet et al. ................ 427/337 |
| 5,624,612 | A | * | 4/1997 | Sewall et al. ................. 264/4.1 |
| 7,754,409 | B2 |  | 7/2010 | Nair et al. |
| 7,887,984 | B2 |  | 2/2011 | Nair et al. |
| 8,110,628 | B1 |  | 2/2012 | Nair et al. |
| 2003/0007990 | A1 | * | 1/2003 | Blankenship et al. ........ 424/408 |
| 2008/0176157 | A1 | * | 7/2008 | Nair et al. ................ 430/108.21 |
| 2009/0045360 | A1 |  | 2/2009 | Wosnick et al. |
| 2010/0021838 | A1 |  | 1/2010 | Putnam et al. |
| 2011/0106255 | A1 | * | 5/2011 | Liu et al. .................... 623/16.11 |
| 2012/0125216 | A1 |  | 5/2012 | Levanon et al. |
| 2012/0167666 | A1 |  | 7/2012 | Nair et al. |
| 2012/0171605 | A1 |  | 7/2012 | Nair et al. |

OTHER PUBLICATIONS

U.S. Appl. No. 13/192,544, filed Jul. 28, 2011, Nair.
U.S. Appl. No. 13/192,521, filed Jul. 28, 2011, Nair.

* cited by examiner

*Primary Examiner* — Michael G Hartley
*Assistant Examiner* — Lance Rider
(74) *Attorney, Agent, or Firm* — J. Lanny Tucker

(57) ABSTRACT

Polymeric porous particles have a continuous solid phase and at least two sets of discrete pores that are isolated from each other within the continuous phase and that have different average sizes. One set of discrete pores has a larger average size than another set of discrete pores by at least 50%. At least one set of discrete pores is free of detectably different marker materials. There porous particles can be prepared using evaporative limited coalescence techniques with especially chosen discrete pore stabilizing hydrocolloids to protect the pores during formation and to provide the different average sizes.

12 Claims, No Drawings

PARTICLES WITH DESIGNED DIFFERENT SIZED DISCRETE PORES

FIELD OF THE INVENTION

This invention relates to porous particles having at least two discrete pores within a continuous polymer phase, and each set of discrete pores have a different average size. This invention also relates to a method for making such porous particles in which the pores are designed to have different average sizes, for example, bimodal or multimodal size distributions. This method can be used to design specific physical properties into the porous particles.

BACKGROUND OF THE INVENTION

Porous polymeric particles have been prepared and used for many different purposes. For example, porous particles have been described for use in chromatographic columns, ion exchange and adsorption resins, drug delivery devices, cosmetic formulations, papers, and paints. The methods for generating pores in polymeric particles are well known in the field of polymer science. However, each particular porous particle often requires unique methods for their manufacture. Some methods of manufacture produce large particles without any control of the pore size while other manufacturing methods control the pore size without controlling the overall particle size.

Marker material can be included in porous particles so that the particles can be detected for a specific purpose. For example, U.S. Patent Application Publications 2008/0176157 (Nair et al.) and 2010/0021838 (Putnam et al.) and U.S. Pat. No. 7,754,409 (Nair et al.) describe porous particles and a method for their manufacture, which porous particles are designed to be toner particles for use in electrophotography. Such porous particles ("toners") can be prepared using a multiple emulsion process in combination with a suspension process (such as "evaporative limited coalescence", ELC) in a reproducible manner and with a narrow particle size distribution.

Toner particles having a luminescent material that includes quantum dots are described in EP 2,025,525 (Wosnick et al.) and can be used to form detectable markings on substrates. These toner particles can also include colorants or other detectable components.

U.S. Pat. No. 7,887,984 (Nair et al.) describes porous toner particles comprising a continuous binder polymer phase and a second phase of a hydrocolloid in discrete pores. These porous toner particles are prepared using limited coalescence techniques.

U.S. Pat. No. 8,110,628 (Nair et al.) describes the preparation of porous particles having first and second discrete pores in which are incorporated detectably different marker materials. Such porous particles are prepared using multiple water-in-oil emulsions and various discrete pore stabilizing hydrocolloids.

While the noted methods and porous particles provide significant advances in the art, there is a need for a way to prepare porous particles that can be free of detectable markers, but which have sets of pores having different averages sizes, for example as bimodal or multi-modal size distribution.

Porous polymeric particles of controlled size are useful in diverse applications such as physical spacers, gaseous absorbers, optical barriers and diffusers, permeable barriers, electrophotographic toners, lubricants, dessicants, and dispersive media. Porous polymeric particles having discrete pores of controlled size are likewise of technological importance to these and other applications where the precise control of particle density, optical scatter, particle modulus, or elasticity or internal porous surface area is advantageous. There is a need to find a way to prepare such porous polymeric particles in a reproducible manner.

SUMMARY OF THE INVENTION

The present invention provides a porous particle comprising a polymer that provides a continuous solid phase including an external particle surface, and at least first and second discrete pores that are isolated from each other and dispersed within the continuous phase, the first and second discrete pores having first and second average sizes, wherein the second average size is greater than the first average size by at least 50%, and the first or second discrete pores are free of detectably different marker materials.

A multiple number of such porous particles can be provided as an aqueous slurry or suspensions, or in an aqueous formulation.

This invention also provides an article comprising a plurality of the porous particles of the present invention. Representative examples of such articles are described below but the present invention is not limited to those specifically mentioned.

The present invention provides a method for preparing a porous particle of the present invention, the method comprising:

providing a first water-in-oil emulsion comprising a first discrete pore stabilizing hydrocolloid in a first aqueous phase that is dispersed within a first oil phase containing a first organic polymer or polymer precursor and a first organic solvent, providing a second water-in-oil emulsion comprising a second discrete pore stabilizing hydrocolloid in a second aqueous phase that is dispersed within a second oil phase containing a second organic polymer or polymer precursor and a first organic solvent, wherein the first discrete pore stabilizing hydrocolloid in the first aqueous phase has a different osmotic pressure than the second discrete pore stabilizing hydrocolloid in the second aqueous phase, by at least 0.4 psi, combining the first and second water-in-oil emulsions to form a third water-in-oil emulsion, dispersing the third water-in-oil emulsion in a third aqueous phase, and removing the first and second organic solvents to form porous particles, each formed porous particle having the composition and properties as described herein.

The present invention provides a number of advantages. For example, it provides porous particles that can be designed to have different sized discrete pores, for example in bimodal or even multi-modal size distributions.

The present invention enables the preparation of these advantageous porous particles using multiple water-in-oil emulsions. The porous polymer particle size, size distribution, and pore size distribution can be controlled by the amount and type of "porogen" used to create the pores, as described below. For example, the use of different pore stabilizing hydrophilic colloids having different osmotic pressure in aqueous solutions enables the user to "design" porous particles with desired pore size distributions.

The ability to control the distribution and size of multiple populations of discrete pores according to the present invention can create unique desirable physical properties such optical scatter, solution imbibition, solute or solvent retention and release.

The properties of aggregated groups of particles or films of the porous particles of this invention can also be favorable for technological application after subsequent processing steps such as compaction, fusing or sintering.

It is also possible to mix various ratios of the porous particles of this invention, having different porosities, which would subsequently stratify under centrifugation to form columns of porous particles of controlled and continuous porosity change to improve the function of separation columns.

Moreover, it is believed that if controlled ratios of the porous particles were placed into a mold and fused, the resulting polymeric articles can have controlled optical scatter properties based upon the ratio and quantity of the initial porous particles. The method of the present invention can be readily scaled up to large-scale manufacturing. This advantage provides a desirable opportunity for designing porous solids of controlled density and light scattering in polymeric solids for three-dimensional printing applications.

The present invention also provides an opportunity to incorporate a marking material selectively into one of the types (sizes) of pores to impart added technological advantage for controlled release, reactivity, or surface area applications of the marker materials.

DETAILED DESCRIPTION OF THE INVENTION

Definitions

As used herein to define various components of the porous particles, phases, and emulsions described herein, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values.

Unless otherwise indicated, % solids or weight % are stated in reference to the total dry weight of a specific formulation, emulsion, or solution.

Unless otherwise indicated, the terms "polymer" and "resin" mean the same thing, and include both homopolymers having the same recurring unit along the organic backbone, as well as copolymers having two or more different recurring units along the backbone. Such polymers or resins include but are not limited to, materials prepared by either condensation or free radical polymerization.

The term "ethylenically unsaturated polymerizable monomer" refers to an organic compound that has one or more ethylenically unsaturated polymerizable groups (such as vinyl groups) that can be polymerized to provide an organic backbone chain of carbon atoms, and optionally various side chains attached to the organic backbone. The polymerized product of a particular ethylenically unsaturated polymerizable monomer, within the organic backbone, is called a "recurring unit". The various recurring units in the polymers are generally distributed along the backbone of a given polymer in a random fashion, although blocks of common recurring units can also be present along the organic backbone.

Uses

The porous particles of this invention can have various uses including but not limited to use in, cosmetic formulations, pharmaceuticals, paints, inks, adhesives, hydrophobic coatings, clear or colored electrophotographic toners, dessicants, gaseous absorbers, lubricants, and dispersive media. The porous particles can also be included in varnishes (colored or colorless) and other coating compositions, polymeric films and fibers, and formed polymer, glass, and ceramic articles including ceramic substrates, bottles, and bottle caps.

Useful articles in which the porous particles can be incorporated include but are not limited to, use in optical diffuser devices, papers, fabrics, fibers, molded objects, optical lenses, matte particles, filters, column media in chromatographic and ion exchange columns, drug delivery devices, and articles (or objects) that can be used for three-dimensional printing operations.

The proliferation of three-dimensional printing and the creation of three-dimensional solids from molded plastics make the utility of creating designer polymeric particles of controlled porosity and pore volume with multiple pore types of controlled density, controlled optical properties, or controlled barrier properties, of great technological importance. In addition, the porous particles of the present invention can be water, small molecule, salt, or gaseous absorbers to impart added functionality to objects created from the porous particles.

Porous Particles

The porous particles are generally prepared, as described below, using multiple water-in-oil emulsions in combination with an aqueous suspension process, such as in the ELC process. Two or more water-in-oil emulsions can be originally prepared and used to provide two or more discrete pores (that is, two or more different sets of pores) in the porous particles, which discrete pores can have different average sizes (defined below).

The terms "porous particle" or "porous particles" are used herein, unless otherwise indicated, to refer to materials of the present invention. The porous particles comprise a continuous solid (polymer) phase having an external particle surface and discrete pores (at least first and second different discrete types of pores as defined below) dispersed within the continuous solid phase.

In many embodiments, the continuous solid phase of the porous particles has the same composition. That is, the continuous solid phase is uniform in composition including any additives that may be incorporated into the polymeric phase. In addition, if mixtures of polymers are used in the continuous solid phase, those mixtures are dispersed uniformly throughout.

The terms "detectably different" or "detectably distinct" refer to different marker materials (or different mixtures of marker materials described below) being detectable from each other using suitable detection means. The porous particles of this invention can contain detectably different marker materials, such as those described in U.S. Pat. No. 8,110,628 (noted above), but only if at least one set of discrete pores contains none of such detectably different marker materials. This means that none of such marker materials is purposely added during manufacture so that at least one set of discrete pores are void of such marker materials (at least the first or second discrete pores are free of detectably different marker materials). In most embodiments, the porous particles of this invention contain no detectably different marker materials in any of the first and second discrete pores, and in still other embodiments, the porous particles contain essentially no detectably different marker materials in any pores (first, second, or any additional discrete pores), meaning that the total amount of such detectably different marker materials in all of the pores of the each porous particle is less than 5 weight % or even less than 1 weight %, based on the total porous particle dry weight.

When present in the some embodiments, the detectably detectable marker materials include but are not limited to colorants (dyes and pigments), metallic pigments, fluorescing materials, radioisotopes, metal oxides, metal hydroxides, metal sulfides, metal oxyhydroxides, luminescing compounds, bioactive materials, reactive chemicals, and enzymes, as described in more detail in U.S. Pat. No. 8,110, 628 (noted above), the disclosure of which is incorporated herein by reference.

The term "porogen" refers to a pore forming agent used to make the porous particles. In this invention, a porogen can be the pore stabilizing hydrocolloid that can be used to modulate the pore size distribution within the porous particles.

As used in this disclosure, the term "isolated from each other" refers to the different (distinct) pores of different sizes that are separated from each other by some of the continuous solid phase.

The terms "first discrete pore" and "second discrete pore" refer to distinct sets of isolated pores in the porous particles. Each distinct set of pores includes a plurality of pores, each of which pores is isolated from others pores in the set of pores, and the pores of each set of pores are isolated from all other pores of the other sets of pores in the porous particle. The first set of pores has a first average pore size and the second (or additional) set of pores has a second (or additional) average pore size, which second average size is average than the first average pore size. The word "discrete" is also used to define different droplets of the first and second aqueous phases when they are suspended in the oil (solvent) phase (described below).

The porous particles include "micro", "meso", and "macro" pores, which according to the International Union of Pure and Applied Chemistry, are the classifications recommended for pores less than 2 nm, from 2 nm and up to and including 50 nm, and greater than 50 nm, respectively. The porous particles can include closed pores of all sizes and shapes (pores entirely within the continuous solid phase). While there can be open pores on the surface of the porous particle, such open pores are not predominant and most pores of each set of pores are generally totally enclosed by the continuous solid phase.

The size of the porous particle, the formulation, the pore stabilizing hydrocolloid, and manufacturing conditions are the primary controlling factors for pore size. The first discrete pores generally have a first average size of at least 0.3 µm and up to and including 3 µm, or more likely at least 0.5 µm and up to and including 2 µm.

The second discrete pores generally have a first average size of at least 0.45 µm and up to and including 10 µm, or more likely at least 0.75 µm and up to and including 8 µm.

The first and second discrete pores in the porous particles have different average sizes wherein the second average size of the second discrete pores is greater than the first average size of the first discrete pores by at least 50%, or typically by at least 100%, and up to and including 2,000%.

In some embodiments, the porous particles can comprise additional discrete pores (additional sets of pores) besides the first and second discrete pores. For example, the porous particles can comprise at least third discrete pores that have an average size that is different from both of the first and second average sizes described herein. For example, if present, the third discrete pores can have an average size that is at least 0.5 µm and up to and including 5 µm, and the average size can be smaller or larger than either or both of the first and second average sizes. These additional sets of pores are generally provided using discrete pore stabilizing hydrocolloids or different osmotic pressures other than those used to prepare the first and second discrete pores, as described below.

For spherical porous particles, the average size is an "average diameter". For non-spherical porous particles, the average size refers to the "average largest dimension". Pore size can be determined by analyzing Scanning Electron Microscopy (SEM) images of fractured porous particles using a commercial statistical analysis software package to study the distribution of the pores within the porous particles, or by manually measuring the pore diameters or largest dimensions using the scale in the SEM images. For example, the "average" pore size for each set of pores can be determined by calculating the average diameter or largest dimension (cross-sectional image) of 20 measured pores.

In some embodiments, the first discrete pores are predominantly nearer then external particle surface compared to the second discrete pores. In other words, the smaller pores are predominantly close to the external particle surface compared to the larger discrete pores. As used herein, the term "predominant" means that a larger number fraction of pores of one size is found in a "shell" area nearer the surface of the porous particle than one would expect based on the total number fraction of the two or more types (sizes) of pores present in the porous particle.

The porous particles generally have a mode particle size of at least 2 µM and up to and including 50 µm, or typically at least 4 µm and up to an including 40 µm, or even at least 4 µm and up to and including 20 µm, with this mode particle size being measured by automated image analysis and flow cytometry using any suitable equipment designed for this purpose. The mode particle size represents the most frequently occurring diameter for spherical porous particles and the most frequently occurring largest dimension for the non-spherical porous particles in a particle size distribution histogram.

In general, the porous particles have porosity of at least 10% and up to and including 80%, or more likely at least 20% and up to and including 50%, or typically at least 20% and up to an including 40%, all based on the total dry porous particle volume. Unless otherwise indicated, porosity can be measured by the Mercury Intrusion Porosimetry technique that uses mercury intrusion to isostatically crush the porous particles at elevated pressures. The decrease in mercury level in the penetrometer capillary is then measured as a function of the pressure needed to crush the closed internal voids in the porous particles. A good correlation has been established between the mercury intrusion technique and an independent method of measuring porosity by aerodynamic sizing. Mercury intrusion was also used to measure the density of a variety of solid and powder samples of known or measured density with excellent accuracy. Other details of the mercury intrusion technique are known in the art.

In many embodiments of this invention, the first and second discrete pores can also comprise first and second discrete pore stabilizing hydrocolloids, respectively, which compounds are described below. The first and second discrete pore stabilizing hydrocolloids can be the same or different compounds as long as they have different osmotic pressures in aqueous solutions, which differences in osmotic pressure are chosen in the method of making the porous particles as described below, and provide the different average sizes of the first and second discrete pores. These materials are incorporated within the respective pores during the preparation of the porous particles as described below.

The porous particles of this invention can be spherical or non-spherical depending upon the desired use. The shape of porous particles can be characterized by an "aspect ratio" that is defined as the ratio of the largest perpendicular length to the longest length of the particle. These lengths can be determined for example by optical measurements using a commercial particle shape analyzer such as the Sysmex FPIA-3000 (Malvern Instruments). For example, porous particles that are considered "spherical" for this invention can have an aspect ratio of at least 0.95 and up to and including 1. For the non-spherical porous particles of this invention, the aspect ratio can be as low as 0.1 and up to and including 0.95, and in some embodiments, the aspect ratio can be 0.99 and down to and including 0.4.

The porous particles comprise a continuous solid phase including an external particle surface. This continuous solid phase is generally composed of one or more organic polymers that are capable of being dissolved in a suitable solvent (described below) that is immiscible with water wherein the organic polymer itself is substantially insoluble in water. Useful organic polymers include those derived from vinyl monomers such as styrene monomers and condensation monomers such as esters and mixtures thereof. Such organic polymers include but are not limited to, homopolymers and copolymers such as polyesters, styrenic polymers (for example polystyrene and polychlorostyrene), monoolefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Particularly useful organic polymers include polystyrenes (including polymers of styrene derivatives), polyesters, styrene/alkyl acrylate copolymers, styrene/alkyl methacrylate copolymers, styrene/acrylonitrile copolymers, styrene/butadiene copolymers, styrene/maleic anhydride copolymers, polyethylene resins, and polypropylene resins. Other useful organic polymers include polyurethanes, urethane acrylic copolymers, epoxy resins, silicone resins, polyamide resins, modified rosins, paraffins, and waxes. Still other useful organic polymers are polyesters of aromatic or aliphatic dicarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The polyesters can be saturated or unsaturated.

In particularly useful embodiments, the continuous solid phase comprises one or more polymers selected from the group consisting of a polyester, styrenic polymer, mono- olefin polymer, vinyl ester polymer, α-methylene aliphatic mono-carboxylic acid ester polymer, vinyl ether polymer, and vinyl ketone polymer.

It is advantageous to utilize organic polymers in the continuous solid phase that have a viscosity of at least 1 cps and up to and including 100 cps when measured as a 20 weight % solution in ethyl acetate at 25° C.

The continuous solid phase can also be provided from polymer precursors (described below) that are reacted or polymerized during preparation of the porous particles to form the desired organic polymer(s). In particular, such polymer precursors include ethylenically unsaturated polymerizable monomers (or oligomers).

The porous particles can also include one or more release agents such as waxes and lubricants. Examples of useful release agents are provided for example in U.S. Patent Application Publication 2008/0176157 (Nair et al.) that is incorporated herein by reference. Such compounds can be present in an amount of at least 0.1 weight % and up to and including 20 weight % based on the porous particle dry weight.

In addition, the porous particles can also include one or more charge control agents (either negative or positive charge control agents). Examples of such compounds are also described in U.S. Patent Application Publication 2008/0176157 (noted above). They can be present in an amount of at least 0.1 weight % and up to and including 5 weight %, based on the porous particle dry weight.

Moreover, the porous particles can comprise a surface stabilizing material, as small solid organic or inorganic particles, on the external particle surface of the porous particles. Useful surface stabilizing agents include but are not limited to, organic stabilizers such as poly(vinyl pyrrolidone) and poly(vinyl alcohol), inorganic stabilizers such as clay particles, colloidal silica (for example LUDOX™ or NALCO™), or polymer latex particles as described in modified ELC process described in U.S. Pat. No. 4,833,060 (Nair et al.), U.S. Pat. No. 4,965,131 (Nair et al.), U.S. Pat. No. 2,934,530 (Ballast et al.), U.S. Pat. No. 3,615,972 (Morehouse et al.), U.S. Pat. No. 2,932,629 (Wiley), and U.S. Pat. No. 4,314,932 (Wakimoto et al.), the disclosures of which are hereby incorporated by reference. Any combination of these surface stabilizing agents can also be used. The amount of surface stabilizing materials in the porous particles can be up to and including 10 weight %, based on the total porous particle dry weight.

The porous particles or mixtures of porous particles can be provided as powders, or as aqueous suspensions or slurries. Such aqueous suspensions or slurries can also include surfactants or suspending agents to keep the porous particles suspended.

The other compositional features of the porous particles are described in the following description of the desired method for preparing the porous particles.

Articles with Porous Particles

The porous particles can be incorporated in a suitable manner into various articles designed as films, fabrics, fibers, molded objects, membranes, tubes, and three-dimension solids. The porous particles can be incorporated within the article, on one or more of its surfaces or both internally and on one or more surfaces.

In some embodiments, a metallic column can be filled with the porous particles of this invention and the porous particles could then be heated to cause the particle surfaces to stick. The speed of migration of liquids or gases though the resulting column of porous particles would vary depending upon the size of the molecules and their ability to move in the space between and within the porous particles.

In other embodiments, a layer of porous particles of this invention having different pore sizes could be annealed using a suitable solvent to form a thin film optical diffuser with designed scattering properties depending upon the optical scattering properties of the designed porous particles.

In yet other embodiments, a series of porous particles could be created and added to a three-dimension molding printer. This printer could make three-dimensional objects of differing density, or porosity or optical scattering based upon the chosen ratio of porous particles and the designed different sizes of pores within the porous particles.

In still other embodiments, a water soluble aromatic agent could be added into the smaller pores of the porous particles of this invention, which water soluble aromatic agent could be retained inside the porous particles and later released into a specified environment at a rate controlled by the number and size of the smaller pores relative to the larger pores in the porous particles.

Method of Preparing Porous Particles

The process for making the porous particles basically involves the formation of three or more water-in-oil emulsions and their coordination combining or dispersing.

A first stable water-in-oil emulsion is formed, comprising a first aqueous phase and generally comprising a first discrete pore stabilizing hydrocolloid, which first aqueous phase is dispersed in a suitable first oil (solvent) phase containing a first polymer or first polymer precursor that eventually helps form a continuous solid phase, which first polymer or polymer precursor is dissolved in one or more first organic solvents (described below). This first aqueous phase creates the first discrete pores in the porous particles having a designed first average size because of the particular choice of first discrete pore stabilizing hydrocolloid and osmotic pressure compared to the other water-in-oil emulsions.

A second stable water-in-oil emulsion is also formed to provide a second aqueous phase generally comprising a second pore stabilizing hydrocolloid, which second aqueous phase is dispersed in a suitable second oil (solvent) phase containing a second polymer or second polymer precursor that eventually helps form the continuous solid phase, which second polymer or polymer precursor is dissolved in one or more second organic solvents (described below). This second aqueous phase creates the second discrete pores in the porous particles having a designed second average size that is larger than the first average size of the first discrete pores. The second pore stabilizing hydrocolloid and aqueous phase osmotic pressure are also chosen so provide the difference between first and second average sizes.

The first and second discrete pore stabilizing hydrocolloids (described below) can be the same or different chemicals, or the same or different mixtures of chemicals or concentrations, as long as the aqueous phase of the first water-in-oil emulsion (with the first pore stabilizing hydrocolloid) has a different osmotic pressure than the aqueous phase of the second water-in-oil emulsion (with the second pore stabilizing hydrocolloid), by at least 0.4 psi, and typically by at least 0.4 psi and to and including 25 psi, or more likely a different osmotic pressure of at least 0.8 psi to and including 10 psi.

Suitably different osmotic pressures of the aqueous phases can be achieved in a number of ways, including but not limited to:

1) Embodiments in which the first and second discrete pore stabilizing hydrocolloids are present in the first and second aqueous phases, respectively, at different concentrations suitably to provide different osmotic pressures of the aqueous phases. In such embodiments, the first and second discrete pore stabilizing hydrocolloids can be the same chemical compounds (same chemical composition and molecular weight). Alternatively, the first and second discrete pore stabilizing hydrocolloids can be different chemical compounds (different chemical compositions or the same chemical composition with different molecular weights).

2) Embodiments in which the first and second discrete pore stabilizing hydrocolloids are present in the first and second aqueous phases at the same concentration, and typically such discrete pore stabilizing hydrocolloids are different chemical compounds, or they are compounds that have the same chemical composition but different molecular weights.

3) Embodiments in which the first and second discrete pore stabilizing hydrocolloids are used in aqueous phases at different pH values such that the osmotic pressures are different in the first and second aqueous phases even when the pore stabilizing hydrocolloids are the same chemical compound and are present in the two aqueous phase at the same concentration.

4) Embodiments in which the first and second discrete pore stabilizing hydrocolloids can be held at different ionic strengths such that the osmotic pressures are different in the two aqueous phases of the emulsions even if the pore stabilizing hydrocolloids are the same chemical composition and are present at the same concentration.

5) Embodiments in which the first and second discrete pore stabilizing hydrocolloids have a combination of different pH, ionic strength, chemical composition, molecular weight, and counter ions such that the osmotic pressures are different in the two aqueous phases.

One can achieve a difference in osmotic pressure in an aqueous phase of the first or second water-in-oil emulsion either by increasing the concentration of the discrete pore stabilizing hydrocolloid or by increasing the charge on the discrete pore stabilizing hydrocolloid (the counter-ions of the dissociated charges on the discrete pore stabilizing hydrocolloid increase its osmotic pressure). It can be advantageous to have weak base or weak acid moieties in the discrete pore stabilizing hydrocolloids that allow for their osmotic pressures to be controlled by changing the pH. Such discrete pore stabilizing hydrocolloids are considered "weakly dissociating hydrocolloids". For these weakly dissociating hydrocolloids, the osmotic pressure can be increased by buffering the pH to favor dissociation, or by simply adding a base (or acid) to change the pH of the aqueous phase to favor dissociation. One example of such a weakly dissociating hydrocolloid is CMC that has a pH sensitive dissociation (the carboxylate is a weak acid moiety).

Suitable discrete pore stabilizing hydrocolloids for preparing all of the water-in-oil emulsions described herein include both naturally occurring and synthetic, water-soluble or water-swellable polymers selected from the group consisting of cellulose derivatives [such for example, carboxymethyl cellulose (CMC) that is also referred to as sodium carboxymethyl cellulose], gelatin (for example, alkali-treated gelatin such as cattle bone or hide gelatin, or acid treated gelatin such as pigskin gelatin), gelatin derivatives (for example, acetylated gelatin and phthalated gelatin), proteins and protein derivatives, hydrophilic synthetic polymers [such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, and methacrylamide copolymers], water soluble microgels, polyelectrolytes [such as a polystyrene sulfonate, poly(2-acrylamido-2-methylpropanesulfonate), and a polyphosphate], and mixtures of any of these classes of materials. Other synthetic polyelectrolyte hydrocolloids such as polystyrene sulfonate (PSS), poly(2-acrylamido-2-methylpropanesulfonate) (PAMS), and polyphosphates are also useful discrete pore stabilizing hydrocolloids.

For example, the first and second discrete pore stabilizing hydrocolloids can be selected from the group consisting of carboxymethyl cellulose (CMC), a gelatin, a protein or protein derivative, a hydrophilic synthetic polymer, a water-soluble microgel, a polystyrene sulfonate, poly(2-acrylamido-2-methylpropanesulfonate), and a polyphosphate.

The first and second oil phases can comprise the same or different organic solvents (described below), or the same or different mixtures of organic solvents. In most embodiments, the first and second oil phases contain the same organic solvents. Further, the first and second polymers or first and second polymer precursors used in preparing the first and second oil phases can be the same or different compounds, or mixtures of compounds, but in most embodiments, they are the same polymer compound or same polymer precursor that is used to prepare the desired polymer compounds.

In order to stabilize the first and second water-in-oil emulsions so that they can be held without ripening or coalescence, it is desired that the first and second discrete pore stabilizing hydrocolloids in the first and second aqueous phases have a higher osmotic pressure than that of the first and second oil phases depending on the solubility of water in the oil. This reduces the diffusion of water into the oil phases from the aqueous phases and thus the ripening caused by migration of water between the water droplets. The discrete pore stabilizing hydrocolloids are soluble in water, have no negative impact on multiple emulsification processes, and have no negative impact on melt rheology of the resulting porous particles. It is important that the pore stabilizing hydrocolloid have minimal solubility in the organic solvent so that it does not migrate between into the organic phase, thus reducing the osmotic pressure of the aqueous phase.

The amount of the first and second discrete pore stabilizing hydrocolloids used to prepare the first and second water-in-oil emulsions (and any additional water-in-oil emulsions) will depend on the amount of porosity and size of discrete pores desired and the molecular weight and charge of the discrete pore stabilizing hydrocolloid that is chosen.

The first and second aqueous phases used in forming the first and second aqueous water-in-oil emulsions can additionally contain, if desired, salts to buffer the emulsions and optionally to control the osmotic pressure of the aqueous phases. When CMC is used as a discrete pore stabilizing hydrocolloid, for example, the osmotic pressure can be increased by buffering using a pH 7 buffer. The first and second water-in-oil emulsions can also contain additional discrete pore forming agents such as ammonium carbonate.

The first and second organic polymers used in the first and second water-in-oil emulsions (or additional water-in-oil emulsions) to provide the continuous solid phase of the porous particles can be any type of polymer or resin or polymer precursor (described above) that is capable of being dissolved in a suitable solvent (described below) and that is immiscible with or only slightly soluble in water (less than 10% solubility) wherein the organic polymer itself is substantially insoluble in water.

Any suitable organic solvent that will dissolve the organic polymer(s) or polymer precursors and that is also immiscible with or slightly soluble in water (less than 10% solubility) can be used to prepare the first and second water-in-oil emulsions (or additional water-in-oil emulsions). Such organic solvents include but are not limited to, ethyl acetate, propyl acetate, chloromethane, dichloromethane, vinyl chloride, trichloromethane, carbon tetrachloride, ethylene chloride, trichloroethane, toluene, xylene, cyclohexanone, 2-nitropropane, dimethyl carbonate, and mixtures of two or more of these solvents. Ethyl acetate and propyl acetate are generally good solvents for many useful polymers while being sparingly soluble in water, and they are readily removed as described below by evaporation.

Optionally, the organic solvents that will dissolve the organic polymers and that is immiscible with water can be a mixture of two or more water-immiscible solvents chosen from the list given above. For example, the oil phase can comprise a mixture of one or more of the above organic solvents with a water-immiscible nonsolvent for the organic polymer such as heptane, cyclohexane, and diethylether that is added in a proportion that is insufficient to precipitate the organic polymer prior to drying and isolation.

Alternatively, the one or more first and second oil phases (organic solvents) can be replaced with one or more ethylenically unsaturated polymerizable monomers as polymer precursors and a polymerization initiator to form water-in-oil-in-water emulsions. The ethylenically unsaturated polymerizable monomers in the emulsified mixture can be polymerized in the third water-in-oil emulsion (described below), for example through the application of heat or radiation (for example actinic or IR radiation) after the third step (described above). Optional organic solvents (described above) can be present in small amounts and have sufficient solubility in water that they can be removed by washing with water. This washing can occur simultaneously with a filtration process. The resulting suspension polymerized precursor porous particles can be isolated and dried as described earlier to yield porous particles of this invention. In addition, either or both oil phases can contain both ethylenically unsaturated polymerizable monomers and organic polymers as described above. Useful ethylenically unsaturated polymerizable monomers and polymerization initiators would be readily apparent to one skilled in the art.

Depending upon the ultimate use of the porous particles, the first and second water-in-oil emulsions can also include various additives, generally that are added to the organic polymer or polymer precursor prior to their dissolution in the organic solvent, during dissolution, or after the dissolution step itself. Such additives can include but are not limited to, charge control agents, shape control agents, compatibilizers, wetting agents, surfactants, plasticizers, and release agents such as waxes and lubricants. Combinations of these materials can also be used. At least one of the first and second aqueous phases can include a buffering salt examples of which are readily known in the art.

As noted above, some of the discrete pores can contain a detectably different marker material as long as either of the first or second discrete pores contains none of these detectably different marker materials. This is achieved by including the detectably different marker materials in the appropriate oil phase of the water-in-oil emulsion. Also, as noted above, in some embodiments, all of the discrete pores contain no detectably different marker materials and thus, none of these materials are purposely added to the first and second (and additional) water-in-oil emulsions.

For example, in some of the embodiments of the method, none of the first, second, and third water-in-oil emulsions contains a detectably different marker material. In other embodiments of the method, the first or second water-in-oil emulsion contains no detectably different marker material.

The first and second water-in-oil emulsions (and any additional water-in-oil emulsions) used to prepare the porous particles can be prepared by any known emulsifying technique and conditions using any type of mixing and shearing equipment. Such equipment includes but is not limited to, a batch mixer, planetary mixer, single or multiple screw extruder, dynamic or static mixer, colloid mill, high pressure homogenizer, sonicator, or a combination thereof. While any high shear type agitation device is useful, a particularly useful homogenizing device is the Microfluidizer® such as Model No. 110T produced by Microfluidics Manufacturing operating at >5000 psi. In this device, the droplets of the first and second aqueous phases can be dispersed separately and reduced in size in the respective oil (organic) phases in a high flow agitation zone and, upon exiting this zone, the particle size of the dispersed aqueous phases is reduced to uniform sized dispersed droplets in each of the respective oil phases. The temperature of the dispersing process can be modified to achieve the optimum viscosity for emulsification of the droplets and to minimize evaporation of the oil phases.

The first and second water-in-oil emulsions are combined to form a third water-in-oil emulsion containing a mixture of the first and second oil phases and distinct droplets of the first and second aqueous phases within those oil phases. These two populations of water-in-oil droplets originating from the two emulsions can have measurably different or similar sizes. The blended emulsion droplet size distribution can be quantified either by direct optical microscopy with image analysis or using a particle sizing techniques, such as Horiba low angle laser light scattering or dynamic light scattering (Zen sizing). In embodiments where there is sufficient size difference between the droplets of the two emulsions, the blended emulsions show a distinct bimodal distribution. This bimodal distribution may or may not be properly separated using light scattering methods, but is easily verified using optical image analysis methods. Even in certain embodiments in which the water-in-oil droplets are too similar in size to allow discrimination between the emulsion droplet size directly, upon equilibration with a third water phase, evaporative limited coalescence, osmotic shock and drying, the resultant pores of the porous particles can be of measurably different sizes due to the amplification of the differences between the original water-in-oil emulsion droplets sizes upon osmotic equilibration with the third (exterior) aqueous phase.

In some embodiments, a third oil phase (containing any of the organic solvents from the list of organic solvents described above) containing a third organic polymer or polymer precursor (chosen from the list of organic polymers described above) can be combined with the first and second water-in-oil emulsions. The third organic polymer can be the same or different from the first and second organic polymers described above. The third oil phase containing the third organic polymer can be combined in this manner in any suitable amount in relation to the first and second water-in-oil emulsions, for example, but not limited to, a weight ratio of from 100:1 and to and including 1:100. The addition of the third oil phase allows the manufacture to use stock solutions of the first and second water-in-oil emulsions and to modify them as desired without having to make up fresh water-in-oil emulsions.

Thus, the method of this invention can further comprise:
providing an additional water-in-oil emulsion comprising a discrete pore stabilizing hydrocolloid (different in some manner from the first and second discrete pore stabilizing hydrocolloids) in an additional aqueous phase that is dispersed within an additional oil phase containing an additional organic polymer or polymer precursor and an additional organic solvent, and
combining the additional water-in-oil emulsion with the first and second water-in-oil emulsions to form the third water-in-oil emulsion.

The first and second water-in-oil emulsions (and any additional water-in-oil emulsions) can be combined in the third water-in-oil emulsion in any desirable weight ratio. For example, in some embodiments, the weight ratio of the first water-in-oil emulsion to the second oil-in-water emulsion can be at least 1000:1 and to and including 0.01:1.

The third water-in-oil emulsion is then dispersed within a third aqueous phase that can contain a surface stabilizing material (described above) to form a water-in-oil-in-water emulsion containing droplets of the third water-in-oil emulsion that contain the distinct droplets of the first and second aqueous phases. For example, the water-in-oil emulsion can be dispersed within the third aqueous phase in the presence of a colloidal silica surface stabilizing material to form a water-in-oil-in-water emulsion containing an aqueous suspension of oil droplets of the third water-in-oil emulsion, wherein the oil droplets contain discrete smaller droplets of the first and second aqueous phases.

The amount of surface stabilizing material (described above) used in the method of this invention can be at least 0.1 weight % and up to and including 10 weight %, or typically at least 0.2 weight % and up to and including 5 weight %, based on the total weight of the water-in-oil-in-water emulsion (third water-in-oil emulsion) and depending upon the particle size of the surface stabilizing material (for example, colloidal or fumed silica particles) and the size of the oil droplets desired to be formed in the third water-in-oil emulsion.

The resulting water-in-oil-in-water emulsion is subjected to shear or extensional mixing or similar flow processes, for example through a capillary orifice device to reduce the first and second aqueous phase droplet size to achieve narrow size distribution droplets through the limited coalescence process. The pH of the third aqueous phase is generally at least 4 to and including 7 when colloidal silica is used as the surface stabilizing material.

It can also be useful to add a shape control agent (described below) to the third aqueous phase, or alternatively, to at least one of the first and second oil phases.

The suspension of droplets of the first and second water-in-oil emulsions in the third aqueous phase results in droplets of organic polymer(s) or polymer precursor dissolved in oil containing the first and second aqueous phase as distinct finer droplets within the bigger organic polymer droplets that upon drying produce first and second discrete pores in the resultant porous particles containing the organic polymer as a continuous solid phase.

When the water-in-oil-in-water emulsion is formed, shear or extensional mixing or flow process can be controlled in order to minimize disruption of the distinct droplets of the first and second aqueous phases in the mixture of first and second oil phases. Droplet size reduction is achieved by homogenizing the third emulsion through a capillary orifice device, or other suitable flow geometry. The shear field used to create the droplets in the third water-in-oil emulsion can be created using standard shear geometries, such as an orifice plate or capillary. However, the flow field can also be generated using alternative geometries, such as packed beds of beads, or stacks or screens that impart an additional extensional component to the flow. It is well known in the literature that membrane-based emulsifiers can be used to generate multiple emulsions. The techniques allow the droplet size to be tailored across a wider range of sizes by adjusting the void volume or mesh size, and can be applied across a wide range of flow rates. The back pressure suitable for producing acceptable porous particle size and size distribution is at least 100 psi and up to and including 5000 psi or typically at least 500 psi and up to and including 3000 psi. The flow rate is generally at least 1000 ml/min and up to and including 6000 ml/min particularly when a capillary orifice device is used.

If desired, additional water can be added to the third aqueous phase of the water-in-oil-in-water emulsion to further control the average size of any or all of the sets of discrete pores by creating an additional osmotic mismatch, for example of at least 0.4 psi, with either the first or second aqueous phase. For example, the amount of dilution of the water-in-oil-in-water emulsion can be at least 50% and up to and including 500%.

The first and second organic solvents of the oil phases are removed to produce an aqueous suspension of uniform particles. Removal of the organic solvents provides precursor porous particles that are then subjected to isolation and drying techniques to provide the porous particles. The details of this process depend upon the water solubility and boiling points of the organic solvents in the oil phases relative to the temperature of the drying process. Generally, however, organic solvents can be removed by evaporation using removal apparatus such as a rotary evaporator or a flash evaporator. The porous particles can then be isolated from the precursor porous particles after removing the organic solvents by filtration or centrifugation, followed by drying for example in an oven at 40° C. that also removes any water remaining in the first and second discrete pores (and any additional discrete pores). Optionally, the porous particles can be treated with alkali to remove any silica surface stabilizing material.

The shape of the porous particles can be modified if desired. Shape control agents can be incorporated into the first or second aqueous phases, in the first or second oil (organic) phase or in the third aqueous phase to modify the shape, aspect ratio, or morphology of the porous particles. The shape control agents can be added after or prior to forming the water-in-oil-in-water emulsion. In either case, the interfacial tension at the oil and third water interface is modified before organic solvent is removed, resulting in a reduction in sphericity of the porous particles. Some useful shape control agents are quaternary ammonium tetraphenylborate salts described in U.S. Patent Application Publication 2007/0298346 (Ezenyilimba et al.), metal salts described in U.S. Patent Application Publication 2008/0145780 (Yang et al.), carnauba waxes described in U.S. Pat. No. 5,283,151 (Santilli), SOLSPERSE® hyperdispersants as described in U.S. Pat. No. 5,968,702 (Ezenyilimba et al.), metal salts as described in U.S. Pat. No. 7,655,375 (Yang et al.), and zinc organic complexes as described in U.S. Pat. No. 7,662,535 (Yang et al.). The disclosure of each of these publications is incorporated herein by reference. The more desirable shape control agents are polyethyloxazoline, fatty acid modified polyesters such as EFKA® 6225 and EFKA® 6220 from Ciba BASF, and phosphate esters of alkoxylated phenols such as SynFac® 8337.

The following Examples are provided to illustrate the practice of this invention and are not meant to be limiting in any manner. In the following Examples:

The polyester resin, Kao E, was obtained from Kao Specialties Americas LLC, a part of Kao Corporation (Japan). Carboxy methylcellulose (Mw 250K) was obtained from Acros Organics or from Ashland Aqualon as Aqualon 9M31F. These were used interchangeably.

Carboxy methylcellulose, low viscosity (Mw 80,000) and Ludox-TM colloidal silica were obtained from Sigma-Aldrich Co.

Nalco™ 1060 colloidal silica was obtained from Nalco Chemical Company as a 50 weight % aqueous dispersion.

The (number) mean size of the particles was measured by fitting the perimeters of scanning electron micrograph (SEM) images and averaging the results. A second method, the MS-3 Beckman Coulter Counter, was also used on select samples. The coulter counter measures the particle size based upon the conductivity contrast between the particle and surrounding electrolyte media as the fluid containing the particle passes through a small orifice. The Coulter Counter gives much better statistics measuring thousands of particles rather than the typical 5-10 particles measured in an SEM image. However, the Coulter Counter electrical signal needs calibration to a standard bead (typically solid polystyrene) to determine the particle size. Because of the possibility of low density porous particles with some pores open to the electrolyte at the surface changing the conductivity contrast compared to the solid beads, we report primarily the SEM results which generally compare favorably to the Coulter Counter results.

To further characterize the porosity and distribution of pore sizes within a given porous particle, representative SEMs were taken of fractured porous particles and simple image analysis methods were used to identify the pores within the porous particles and then to measure the diameter of the pores. The ratio of the area of pores to the total area of the particle in the best flat region of a cross section was used as a measure of percent porosity.

The cross section of a particle is a 2D planar slice through a 3D spherical structure so that the measured circular "pores" are actually planar slices through individual spherical pores. The measured size of these pores will appear smaller and more broadly distributed than the true diameter because most planar slices will not fall exactly through the center of the pores. We report the average of the maximum size pore measured from several particles. For the bimodal porous particles we report the average of the maximum size pore for both the large and small pores measured from several particles. Clearly this method requires sufficient separation between the bimodal pore sizes to identify large and small pores unambiguously.

Another method of measuring the size and shape of the porous particles is to use a Sysmex FPIA-3000 automated particle shape and size analyzer from Malvern Instruments. In this method, samples are passed through a sheath flow cell that transforms the particle suspension into narrow or flat flow, ensuring that the largest area of the particle is oriented towards the camera and that all particles are in focus. The CCD camera captures 60 images every second and these are analyzed in real time. Numerical evaluation of particle shape is derived from measurement of the area of the particle. A number of shape factors are calculated including circularity, aspect ratio, and circle equivalent diameter. For this instrument the reported size of the particles is the mode value of the distribution.

Unless otherwise indicated, the porous particle porosity was determined using Mercury Intrusion Porosimetry.

The porous polymer particles used in the Examples were made using the following procedures:

Control 1: Porous Particles Prepared Using 5% 80K CMC without Orifice Homogenizer An organic solvent (oil) phase was prepared using 85 g of a 20 weight % solution of Kao E in ethyl acetate. This oil phase was emulsified with an aqueous phase containing 26.25 g of a 3.24 weight % solution of 80 kilodalton CMC using the Silverson Mixer followed by homogenization in the Microfluidizer® at 8000 psi yielding a water-in-oil emulsion. A 61 g aliquot of this emulsion was emulsified into a water phase consisting of 150 g of a 200 mmolar citrate phosphate buffer at pH 4 and 7 g of Ludox TM using the Silverson Mixer fitted with a General-Purpose Disintegrating Head for two minutes at 2000 RPM to form a water-in-oil-in-water emulsion. The ethyl acetate was removed by evaporation using a Heidolph Laborata rotary evaporator at 40° C. under reduced pressure. The resulting milky white porous particles were sieved through a 20 μm metallic mesh and washed with base and distilled water and then dried in an oven. SEM analysis of these particles yielded a mean size of 17.0 μm and a broad size distribution with standard deviation of more than 4 μm. Upon fracture and further SEM analysis, it was determined that the particles had an averaged particle porosity of 29% and a mean pore size of 0.74 μm. Analyzing the images and finding the maximum pore size consistent with fitting all of the pores into a 3D (three dimensional) structure yielded an average (max) pore size of 1.0 μm.

Control 2: Porous Particles Using 2% 250K CMC with Orifice Homogenizer and Post Make at 1:1 Dilution An organic phase (894.7 g) containing 20 weight % of Kao E in ethyl acetate was emulsified with an aqueous phase prepared with 290.3 g of a 2.00 weight % of 250K CMC using the Silverson Mixer followed by homogenization in the Microfluidizer® at 9800 psi to give a water-in-oil emulsion. An 183 g aliquot of this water-in-oil emulsion was then added to a third aqueous phase consisting of 373 g of a 200 mmolar citrate phosphate buffer at pH 4 and 16.8 g of Nalco™ 1060 using the Silverson Mixer fitted with a General-Purpose Disintegrating Head for two minutes at 2000 RPM, followed by homogenization in an orifice disperser at 1000 psi to form a water-in-oil-in-water emulsion. The ethyl acetate was evaporated using a Heidolph Laborata rotary evaporator at 40° C. under reduced pressure. The resulting suspension of porous particles was filtered through a glass fritted funnel and the porous particles were washed with distilled water and then dried under ambient conditions. SEM analysis of these milky white porous particles yielded a mean size of 6.00 μm and a narrow size distribution with standard deviation of 0.59 μm. For comparison, these porous particles had a size of 6.17 μm as measured by the Coulter Counter. Upon fracture and SEM analysis, the averaged particle porosity was determined to be 60%. This porosity is twice the porosity of the porous particles of Control 1, consistent with the 1:1 post make dilution inflating the porosity of the porous particles. A mean pore size of 1.1 μm was measured. Analyzing the images and finding the maximum pore size consistent with fitting all of the pores into a 3D structure yielded an average (max) pore size of 1.3 μm.

Invention Example 1

Porous Particles from Two Water-in-oil Emulsions Blended with Different Molecular Weight Hydrocolloids With 70% 80K CMC and 30% 250K CMC Giving Bimodal Pore Sizes Porous particle of this invention were prepared using a first organic phase (134.8 g) containing 20 weight % of Kao E in ethyl acetate was emulsified with the first aqueous phase prepared with 41.75 g of a 1.94 weight % of 80K CMC using the Silverson Mixer followed by homogenization in the Microfluidizer® at 9800 psi to give a first water-in-oil emulsion. A second water-in-oil emulsion was prepared with the second organic phase having 134.8 g of an 20.0 weight % of Kao E in ethyl acetate, and the second aqueous phase containing 41.75 g of a 1.94 weight % solution of 250K CMC in the same manner as the first water-in-oil emulsion. A 70 g aliquot of the first water-in-oil emulsion and a 30 g aliquot of the second water-in-oil emulsion were then blended with gentle mixing. Samples of this mixed first and second water-in-oil emulsion blend were viewed under optical microscopy and measured with Horiba light scattering. A 100 g aliquot of the mixture of first and second water-in-oil emulsions was then added to a third aqueous phase consisting of 159.7 g of a 200 mmolar citrate phosphate buffer at pH 4 and 7 g of Nalco™ 1060 using the Silverson Mixer fitted with a General-Purpose Disintegrating Head for two minutes at 2000 RPM, followed by homogenization in an orifice disperser at 1000 psi to form a water-in-oil-in-water emulsion. The ethyl acetate was evaporated using a Heidolph Laborata rotary evaporator at 40° C. under reduced pressure. The resulting suspension of porous particles was filtered through a glass fritted funnel and the polymeric particles were washed with distilled water and then dried under ambient conditions. The resulting polymeric porous particles had a mean size of 6.0 μm. The milky white particles upon fracture and SEM image analysis had 23.4% porosity with two distinct populations of different sized pores. There were 80% small pores of (max) size 0.83 μm and 20% large pores of (max) size 1.7 μm. This fraction reasonably reflects the expected 70/30 input fraction of each emulsion. The first emulsion with 80K CMC yields smaller pores as expected reflecting the lower initial osmotic pressure of the lower molecular weight CMC. The images show clearly that these are bimodal porous particles.

Invention Example 2

Porous Particles from Two Water-in-oil Emulsions Blended Using Different Molecular Weight Hydrocolloids with 30% 80K CMC and 70% 250K CMC Giving Bimodal Pore Sizes Porous particles of this invention were prepared as described in Invention Example 1 except that a 30 g aliquot of the first water-in-oil emulsion (with 1.94% 80K CMC) was added to a 70 g aliquot of the second water-in oil-emulsion (with 1.94% 250K CMC) with gentle mixing. This mixture of first and second water-in-oil emulsions was then added to a third aqueous phase containing 159.7 g of the citrate phosphate buffer and 7 g of Nalco™ 1060. The homogenization, solvent evaporation, and drying of the porous particles were carried out as described in Invention Example 1. The resulting porous particles, upon fracture and SEM image analysis, had a mean size of 6.3 μm and a porosity of 27.5%. The milky white porous particles had two separate populations of discrete pores. The SEM image cross section had 35% small pores of averaged (max) size 0.42 μm and 65% large pores of averaged (max) size 1.8 μm. This fraction reasonably reflected the expected 30/70 input fraction of each emulsion in the water-in-oil-in-water emulsion. The second emulsion with 250K CMC yielded larger pores as expected reflecting the higher initial osmotic pressure of the higher molecular weight CMC.

Invention Example 3

Porous Particles from Two Water-in-oil Emulsions Blended Using Different Molecular Weight Hydrocolloids with 70% 80K CMC and 30% 250K CMC Giving Bimodal Pore Sizes with 1:1 Post Make Dilution Porous particles of this invention were prepared as described in Invention Example 1 except that after the addition of the third water phase and homogenization to form the water-in-oil-water emulsion, a 20 g aliquot of the water-in-oil-water emulsion was diluted with 20 g of pure water. This 1:1 diluted water-in-oil-in-water emulsion was then subjected to solvent evaporation, and drying of the porous particles as described in Invention Example 1. The resulting porous particles upon fracture and SEM image analysis had a mean size of 6.4 μm and a porosity of 40.7%. The milky white porous particles had primarily separate populations of discrete pores. The SEM image cross section had 70% small pores of averaged (max) size 0.57 μm and 30% large pores of averaged (max) size 2.32 μm. This fraction of pores matched excellently the 70/30 fraction of the two emulsions used. The porosity was notably larger than in Invention Example 1 due to the dilution step. In some porous particles, the dilution step caused the largest pores to coalesce to form very large central pores surrounded by smaller pores around the periphery of the particle (near the outer surface).

Invention Example 4

Porous Particles from Two Water-in-oil Emulsions Blended Using Different Molecular Weight Hydrocolloids with 30% 80K CMC Plus 70% 250K CMC Giving Bimodal Pore Sizes with 1:1 Post Make Dilution Porous particles of this invention were prepared as described in Invention Example 2 except that after addition of the third water phase and homogenization to form the water-in-oil-in-water emulsion, a 20 g aliquot of this emulsion was diluted with 20 g of pure water. This 1:1 diluted water-in-oil-in-water mixture was then subject to solvent evaporation, and the porous particles were dried as described in Invention Example 1. The resulting porous particles upon fracture and SEM image analysis had a mean size of 7.0 μm and a porosity of 49.5%. The milky white porous particles had two separate populations of pores with 39% small pores of average (max) size of 0.43 μm and 61% large pores of average (max) size 1.96 μm. This fraction reasonably reflects the expected input fraction 30/70 of each water-in-oil emulsion. The second water-in-oil emulsion with 250K CMC again yielded larger pores as expected reflecting the higher initial osmotic pressure of the higher molecular weight CMC. The porosity of the porous particles was notably larger than in those prepared in Invention Example 2 due to the water dilution step.

The invention has been described in detail with particular reference to certain preferred embodiments thereof, but it will be understood that variations and modifications can be effected within the spirit and scope of the invention.

The invention claimed is:

1. A porous particle comprising one or more organic polymers that provide a polymer that provides a continuous solid phase including an external particle surface, and at least first and second discrete closed pores that are isolated from each other and dispersed within the continuous phase, the first and second discrete closed pores having first and second average sizes, wherein:
the second average size is greater than the first average size by at least 50%,
the first or second discrete closed pores are free of detectably different marker materials selected from the group consisting of colorants (dyes and pigments), metallic pigments, fluorescing materials, radioisotopes, metal oxides, metal hydroxides, metal sulfides, metal oxyhydroxides, and luminescing compounds,
the porous particle has a mode particle size of at least 2 μm and up to and including 50 μm, and
the first and second discrete closed pores comprise first and second discrete pore stabilizing hydrocolloids, respectively, which provide different osmotic pressures of at least 0.4 psi.

2. The porous particle of claim 1, wherein second average size of the second discrete closed pores is greater than the first average size of the first discrete pores by at least 100%.

3. The porous particle of claim 1, wherein the first discrete closed pores are predominantly nearer the external particle surface compared to the second discrete closed pores.

4. The porous particle of claim 1, wherein the first and second discrete closed pores comprise first and second discrete pore stabilizing hydrocolloids, respectively, that are independently selected from the group consisting of carboxymethyl cellulose (CMC), a gelatin or gelatin derivative, a protein or protein derivative, a hydrophilic synthetic polymer, a water-soluble microgel, a polystyrene sulfonate, poly (2-acrylamido-2-methylpropanesulfonate), and a polyphosphate.

5. The porous particle of claim 1, wherein the first discrete closed pores have a first average size of at least 0.3 μm and to and including 3 μm, and the second discrete closed pores have a second average size of at least 0.45 μm and to and including 10 μm.

6. The porous particle of claim 1, further comprising at least a third discrete population of closed pores that have an average size that is different from both of the first and second average sizes.

7. The porous particle of claim 1, wherein there are no detectably different marker materials in the first and second discrete closed pores.

8. The porous particle of claim 1, wherein there are no detectably different marker materials in any of its closed pores.

9. The porous particle of claim 1 that has a porosity of at least 20% and up to and including 50% based on total porous particle volume.

10. The porous particle of claim 1, wherein the continuous solid phase comprises one or more polymers selected from the group consisting of a polyester, styrenic polymer, monoolefin polymer, vinyl ester polymer, α-methylene aliphatic mono-carboxylic acid ester polymer, vinyl ether polymer, and vinyl ketone polymer.

11. The porous particle of claim 1 further comprising a surface stabilizing material on the external particle surface.

12. An aqueous slurry of multiple porous particles as defined in claim 1.

* * * * *